United States Patent
Kim et al.

(10) Patent No.: US 10,137,760 B2
(45) Date of Patent: Nov. 27, 2018

(54) PTC HEATER FOR VEHICLE

(71) Applicant: HANON SYSTEMS, Daejeon (KR)

(72) Inventors: Young In Kim, Daejeon (KR); Jun Min Lee, Daejeon (KR); Jung Won Cho, Daejeon (KR); Sang Ho Oh, Daejeon (KR); Chae Geun Lim, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/566,749

(22) PCT Filed: Apr. 21, 2016

(86) PCT No.: PCT/KR2016/004135
§ 371 (c)(1),
(2) Date: Oct. 16, 2017

(87) PCT Pub. No.: WO2016/171478
PCT Pub. Date: Oct. 27, 2016

(65) Prior Publication Data
US 2018/0117993 A1    May 3, 2018

(30) Foreign Application Priority Data

Apr. 21, 2015 (KR) .................. 10-2015-0055723
Apr. 20, 2016 (KR) .................. 10-2016-0047956

(51) Int. Cl.
*H05B 1/02* (2006.01)
*B60H 1/22* (2006.01)

(52) U.S. Cl.
CPC ..... *B60H 1/2225* (2013.01); *B60H 2001/229* (2013.01); *H05B 2203/02* (2013.01)

(58) Field of Classification Search
CPC ........ H05B 1/0236; H05B 3/004; H05B 3/02; H05B 3/13; H05B 2003/02; B60H 1/2225; B60H 2001/229
(Continued)

(56) References Cited

U.S. PATENT DOCUMENTS

| 2004/0169027 A1* | 9/2004 | Bohlender | B60H 1/2225 |
| | | | 219/202 |
| 2012/0193339 A1* | 8/2012 | Adachi | B60H 1/2221 |
| | | | 219/202 |

(Continued)

FOREIGN PATENT DOCUMENTS

| KR | 20060025063 A | 3/2006 |
| KR | 100609452 B1 | 7/2006 |

(Continued)

OTHER PUBLICATIONS

International Search Report and Written Opinion dated Aug. 17, 2016 from International Patent Application Serial No. PCT/KR2016/004135, with English translation of International Search Report.

*Primary Examiner* — Mark Paschall
(74) *Attorney, Agent, or Firm* — Dickinson Wright PLLC

(57) ABSTRACT

Disclosed herein is a PTC heater for a vehicle, which includes a plurality of cores, such as a first core and a second core, disposed independently and respectively arranged in a first passageway and a second passageway of an air-conditioning case to be controlled independently, thereby reducing manufacturing costs and weight of the air conditioner, enhancing vehicle fuel efficiency and productivity, being easily applicable to other vehicles using PTC heaters because one PTC heater is used for independent control at the right and the left.

8 Claims, 7 Drawing Sheets

(58) Field of Classification Search
USPC .............. 219/202, 208, 504, 505, 483–486
See application file for complete search history.

(56) References Cited

U.S. PATENT DOCUMENTS

2013/0186966 A1\* 7/2013 Taguchi .............. B60H 1/2221
237/57
2015/0369515 A1\* 12/2015 Kim ..................... F24H 3/0429
392/485

FOREIGN PATENT DOCUMENTS

| KR | 100610383 | B1 | 8/2006 |
| KR | 200442139 | Y1 | 10/2008 |
| KR | 20100038571 | | 4/2010 |

\* cited by examiner

PRIOR ART

PRIOR ART

PRIOR ART

PTC HEATER FOR VEHICLE

CROSS-REFERENCE TO RELATED APPLICATIONS

This application is a U.S. National Stage of International Application No. PCT/KR2016/004135, filed Apr. 21, 2016, which claims the benefit and priority of KR 10-2015-0055723 filed Apr. 21, 2015 and KR 10-2016-0047956 filed Apr. 20, 2016. The entire disclosures of each of the above applications are incorporated herein by reference.

TECHNICAL FIELD

The present invention relates to a PTC heater for a vehicle, and more particularly, to a positive temperature coefficient (hereinafter, called 'PTC') heater for a vehicle, which includes a plurality of cores, such as a first core and a second core, disposed independently and respectively arranged in a first passageway and a second passageway of an air-conditioning case to be controlled independently.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

FIG. 1 illustrates an example of the air conditioner for a vehicle. As shown in FIG. 1, the air conditioner includes: an air-conditioning case 10 which has an air inflow port 11 formed at an inlet side thereof and a plurality of air outflow ports formed at an outlet side thereof; an evaporator 1 and a heater core 2 mounted inside the air-conditioning case 10; a temp door 20 mounted between the evaporator 1 and the heater core 2 to control temperature; and mode doors 30 which are respectively mounted at the air outflow ports 12 to adjust the degree of opening of the air outflow ports 12 according to air-conditioning modes.

Such an air conditioner carries out heating by circulating coolant, which is heated by an engine, in the heater core 2. However, at the early stage of starting the engine, because temperature of the coolant is low, the air conditioner cannot carry out heating using the coolant. Therefore, as an auxiliary heating device for heating at the early stage of starting the engine, a PTC heater 5 is used to heat using an electric energy of a battery.

Moreover, such a positive temperature coefficient (hereinafter, called 'PTC') heater 5 is installed on an air conditioner for recently developed electric vehicles. Because the heater core 2 using combustion heat of the engine cannot be mounted in the air conditioner for electric vehicles, the PTC heater 5 serves as a main heating device.

FIG. 2 illustrates a PTC heater. The PTC heater 5 is configured in such a way that a plurality of heating rods 6, in each of which a PTC element and a (+) terminal are embedded, and a plurality of heating rods 6, in each of which a PTC element and a (−) terminal are embedded, are arranged to be spaced apart from each other at a predetermined interval and radiation fins 7 are interposed between the heat rods 6.

A control unit 8 having a voltage control element (not shown) for controlling voltage supplied to the (+) terminal and the (−) terminal of the heating rods 6 is mounted at one side of the PTC heater 5.

Therefore, the PTC heater can variably control voltage supplied to the PTC heater 5 through a duty ratio control of a pulse width modulation (PWM) signal corresponding to a set temperature of the interior of the vehicle.

In other words, the voltage control element of the control unit 8 of the PTC heater 5 can vary voltage supplied to the terminal of each heating rod 6 by a duty ratio of the PWM signal, and in this instance, output temperature (heat value) of the PTC element attached to the terminal is varied, such that air passing through the radiation fins 7 is heated.

Moreover, as shown in FIG. 2, a single PTC heater 5 is mounted on the air-conditioning case 10 of a general air conditioner, but in the case that the inside of the air-conditioning case 10 like air conditioners, each of which has an independent control function at the right and the left (a driver's seat and a passenger's seat), is divided into a left passageway 10a and a right passageway 10b by a separator 13, as shown in FIG. 3, two PTC heaters 5 are respectively mounted at the left passageway 10a and the right passageway 10b inside the air-conditioning case 10 one by one to provide a perfect independent control at the right and the left.

However, if the two PTC heaters 5 are mounted on the air-conditioning case 10, it increases manufacturing costs and weight of the air conditioner, and deteriorates vehicle fuel efficiency and productivity.

DISCLOSURE

Technical Problem

Accordingly, the present invention has been made in view of the above-mentioned problems occurring in the prior art, and it is an object of the present invention to provide a PTC heater for a vehicle, which includes a plurality of, such as a first core and a second core, disposed independently and respectively arranged in a first passageway and a second passageway of an air-conditioning case to be controlled independently, thereby reducing manufacturing costs and weight of the air conditioner, enhancing vehicle fuel efficiency and productivity, being easily applicable to other vehicles using PTC heaters because one PTC heater is used for independent control at the right and the left.

Technical Solution

To accomplish the above object, according to the present invention, there is provided a positive temperature coefficient (PTC) heater for a vehicle, which is inserted and mounted in a plurality of passageways formed inside an air-conditioning case to heat air flowing in the passageways, including: a housing inserted and mounted across the passageways of the air-conditioning case; and a core part formed by a plurality of cores respectively arranged on the passageways inside the housing, thereby independently controlling the cores arranged on the passageways to independently control airs respectively flowing in the passageways.

Advantageous Effects

As described above, the PTC heater for the vehicle according to the present invention includes a plurality of cores, such as a first core and a second core, disposed independently and respectively arranged in a first passageway and a second passageway of an air-conditioning case to be controlled independently. Therefore, because one PTC heater is used for independent control at the right and the left, the PTC heater for the vehicle can reduce manufacturing costs and weight of the air conditioner and enhance vehicle fuel efficiency and productivity.

Moreover, the PTC heater for the vehicle according to the present invention can provide an effective heating performance even in a small space and is easily applicable to other vehicles using PTC heaters manufactured by the same manufacturing company.

MODE FOR INVENTION

Figure 1:
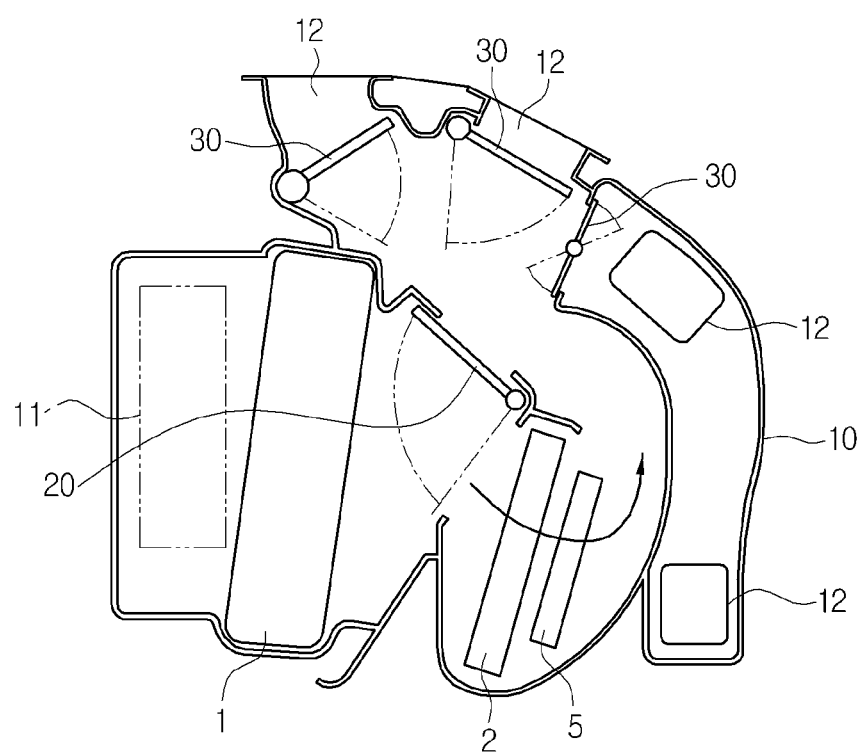
FIG. 1 is a sectional view showing a state where a PTC heater is mounted in a general air conditioner.
Figure 2:
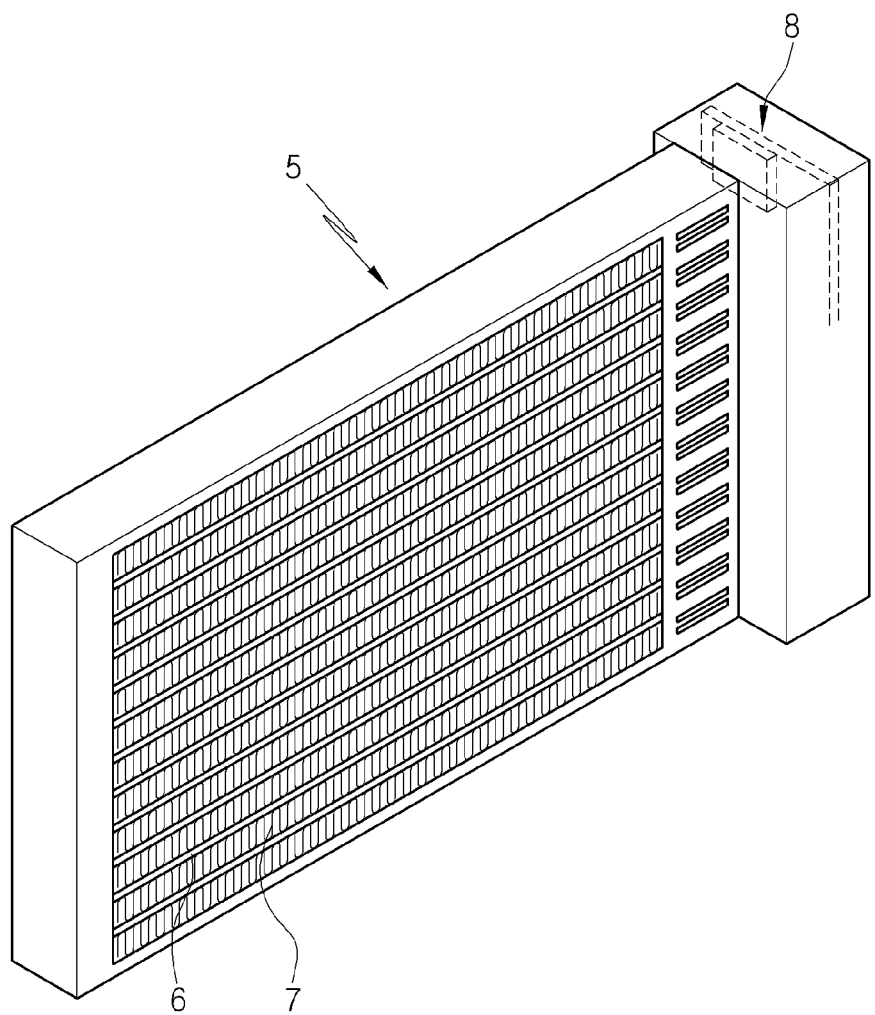
FIG. 2 is a perspective view of the PTC heater of FIG. 1.
Figure 3:
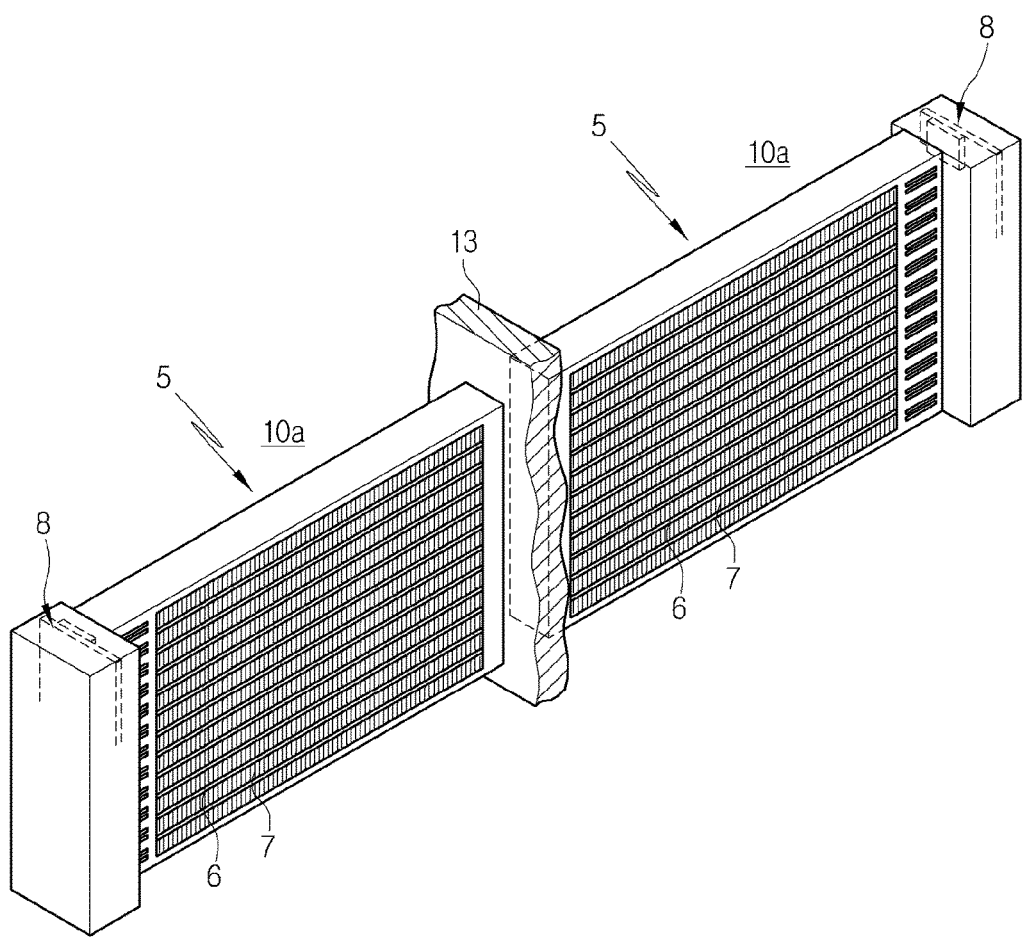
FIG. 3 is a partially perspective view showing a state where two conventional PTC heaters are mounted in right and left passageways of an air-conditioning case.
Figure 4:
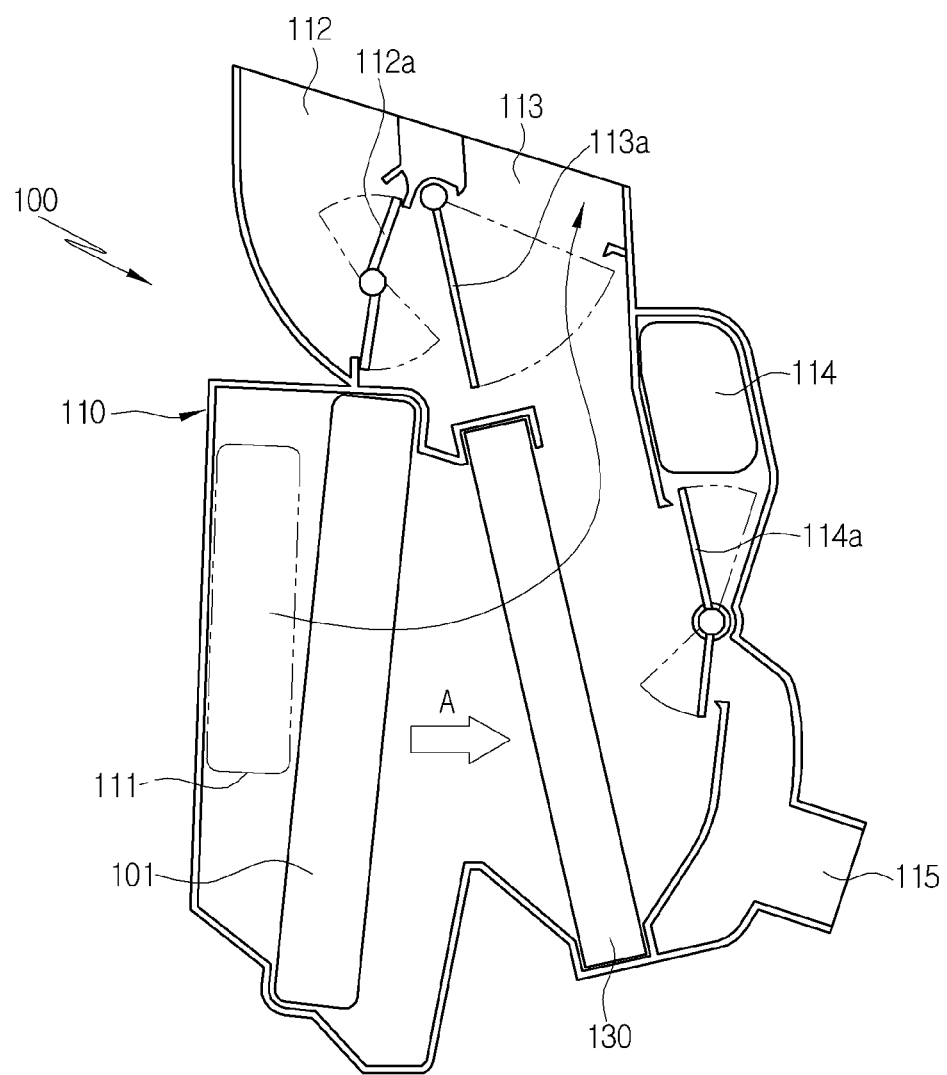
FIG. 4 is a sectional view showing a state where a PTC heater for a vehicle according to a preferred embodiment of the present invention is mounted in an air-conditioning case.

Reference will be now made in detail to the preferred embodiment of the present invention with reference to the attached drawings.

Preferably, a positive temperature coefficient (hereinafter, called 'PTC') heater is installed in electric vehicles or hybrid vehicles, but besides the above vehicles, may be installed in general vehicles using a combustion engine. Hereinafter, for convenience's sake, a case that the PTC heater is applied to an air conditioner installed in an electric vehicle will be described as an example.

First, in the electric vehicle, a PTC heater 130 is utilized for heating, and an air conditioner cycle (electric drive compressor-condenser-expansion valve-evaporator) using an electric drive compressor is utilized for cooling.

An example of an air conditioner 100 in which the PTC heater 130 is mounted will be described in brief. The air conditioner 100 includes: an air-conditioning case 110 which has an air inflow port 111 formed at one side thereof and a plurality of air outflow ports formed at the other side thereof; an evaporator mounted inside the air-conditioning case 110; a separator 120 for dividing an inner path of the air-conditioning case 110 into a plurality of passageways; and a PTC heater 130 inserted and mounted in the passageways formed inside the air-conditioning case 110 to heat air flowing in the passageways.

The passageways are a first passageway 110a and a second passageway 110b, which are formed inside the air-conditioning case 110.

In this instance, the first passageway 110a and the second passageway 110b are partitioned from each other by the separator 120 mounted inside the air-conditioning case 110.

The air-conditioning case 110 is formed when a left case and a right case divided on the basis of the separator 120 are assembled together.

In the meantime, in the air-conditioning case 110, the first passageway 110a is a path for supplying air toward the passenger's seat, and the second passageway 110b is a path for supplying air toward the driver's seat.

An air outflow port of the air-conditioning case 110 includes a defrost vent 112 for discharging air toward the front window of the vehicle, a face vent 113 for discharging air toward a passenger's face, and floor vents 114 and 115 for discharging air toward the passenger's feet, and the vents are opened and closed by mode doors.

The floor vents 114 and 115 are a front seat floor vent 114 for discharging air toward the feet of a passenger who sits on the front seat, and a rear seat floor vent 115 for discharging air toward the feet of a passenger who sits on the rear seat.

The mode doors are a defrost door 112a for opening and closing the defrost vent 112, a face door 113a for opening and closing the face vent 113, and a floor door 114a for opening and closing the floor vents 114 and 115.

In the meantime, a blower unit (not shown) is mounted at the air inflow port 111 of the air-conditioning case 110 to blow indoor air or outdoor air toward the air inflow port 111 of the air-conditioning case 110.

Furthermore, the separator 120 divides the inside of the air-conditioning case 110 from the downstream side of the evaporator 101 to the air outflow port into the first passageway 110a and the second passageway 110b.

Meanwhile, the drawings illustrate a structure that there is no temperature adjusting door between an evaporator 101 and the PTC heater 130, but the temperature adjusting door may be mounted according to use purposes.

Additionally, the PTC heater 130 is a single PTC heater, and includes: a housing 131 which is inserted and mounted across the first passageway 110a and the second passageway 110b of the air-conditioning case 110; and a core part 132 formed by a plurality of cores respectively arranged on the passageways inside the housing 131.

The cores are a first core 133 arranged on the first passageway 110a and a second core 134 arranged on the second passageway 110b.

Therefore, when the first core 133 and the second core 134 of the PTC heater 130 are controlled independently, airs respectively flowing in the first passageway 110a and the second passageway 110b of the air-conditioning case 110 can be heated independently.

In other words, when heat values of the first core 133 and the second core 134 are controlled differently, temperatures of the airs respectively flowing in the first passageway 110a and the second passageway 110b can be controlled differently, such that air discharged toward the driver's seat and air discharged toward the passenger's seat in the interior of the vehicle may have different temperatures.

The housing 131 includes a first case 131a and a second case 131b, which are assembled to each other in order to fix the edge of the core 132, and a control unit 136 for controlling voltage supplied to the first core 133 and the second core 134 is disposed at one side of the housing 131.

In this instance, the housing 131 has an air passageway part 131c formed to penetrate through the housing 131, such that air passes the core part 132 through the air passageway part 131c of the housing 131.

The control unit 136 includes a PCB substrate (not shown) and a voltage control element (not shown) for controlling voltage supplied to a (+) terminal and a (−) terminal of heating rods 132a, which will be described later.

Moreover, the control unit 136 is disposed at one side of the housing 131 in parallel with the heat rods 132a of the first core 133 and the second core 134.

That is, conventionally, the heating rods of the core part are arranged toward the control unit, but in the present invention, because the heating rods 132a of the core part 132 are arranged in parallel with the control unit 136, the PCB substrate of the control unit 136 is connected with the (+) terminal and the (−) terminal of the heating rods 132a through the inside of the edge of the housing 131.

In the meantime, the PTC heater 130 is mounted in such a way that only the core part 132 is inserted into the air-conditioning case 110 and the control unit 136 is located on the outer surface of the air-conditioning case 110.

Furthermore, each of the first core 133 and the second core 134 includes a plurality of the heating rods 132a and radiation fins 132b mounted between the heating rods 132a.

In this instance, the heating rod 132a of the first core 133 and the heating rod 132a of the second core 134 are mounted to be parallel with each other.

Additionally, the heating rod 132a of the first core 133 and the heating rod 132a of the second core 134 are mounted to be at right angles to the right-and-left direction inside the air-conditioning case 110.

That is, conventionally, the heating rods of the PTC heater are mounted in the right-and-left direction (horizontal direction) to cross the inside of the air-conditioning case, but the heating rods 132a of the PTC heater 130 according to the preferred embodiment of the present invention are mounted in the vertical direction inside the air-conditioning case 110.

In other words, the PTC heater 130 is inserted and mounted into the inside of the air-conditioning case 110 through the left side or the right side of the air-conditioning case 110, and in this instance, the heating rods 132a are mounted at right angles to the direction that the PTC heater 130 is inserted into the air-conditioning case 110.

Due to the mounting structure of the heating rods 132a, the first core 133 and the second core 134 can be controlled independently in the single PTC heater 130.

In the meantime, the heating rods 132a, in each of which the (+) terminal (not shown) and the PTC element (not shown) are embedded, and the heating rods 132a, in each of which the (−) terminal (not shown) and the PTC element (not shown) are embedded, are spaced apart from one another at a regular interval and are mounted by turns.

Therefore, when voltage is supplied to the (+) terminal and the (−) terminal of the heating rods 132a through the control unit 136, the PTC element generates heat, and then, the heating rods 132a are heated and transfer heat to the radiation fins 132b. In this instance, air passing through each of the radiation fins 132b of the core part 132 is heated.

The control unit 136 variably control the voltage supplied to the first core 133 and the second core 134 of the core part 132 so as to independently control the heat values of the first core 133 and the second core 134.

Meanwhile, for the independent control of the first core 133 and the second core 134, temperature sensors (not shown) are respectively mounted on the first core 133 and the second core 134 to detect temperatures of the first core 133 and the second core 134. That is, the first core 133 and the second core 134 are controlled by the temperature sensors respectively mounted on the first core 133 and the second core 134.

Moreover, a heat protection member 135 for preventing heat transfer between the first core 133 and the second core 134 is mounted between the first core 133 and the second core 134.

That is, when the heat values of the first core 133 and the second core 134 are controlled differently, it can prevent unnecessary heat transfer between the first core 133 and the second core 134 to prevent deterioration in performance.

The heat protection member 135 includes a bypass hole 135a to make some of the air passing through the PTC heater 130 bypass the first core 133 and the second core 134 so as to effectively prevent heat transfer between the first core 133 and the second core 134.

The heat protection member 135 having the bypass hole 135a prevents unnecessary heat transfer between the first core 133 and the second core 134 or lowers temperature of the core part 132.

In the meantime, the heat protection member 135 is formed in a lattice type such that that bypass hole 135a is also formed in a lattice type.

Preferably, the heat protection member 135 is mounted at a position corresponding to the separator 120.

Figure 7:
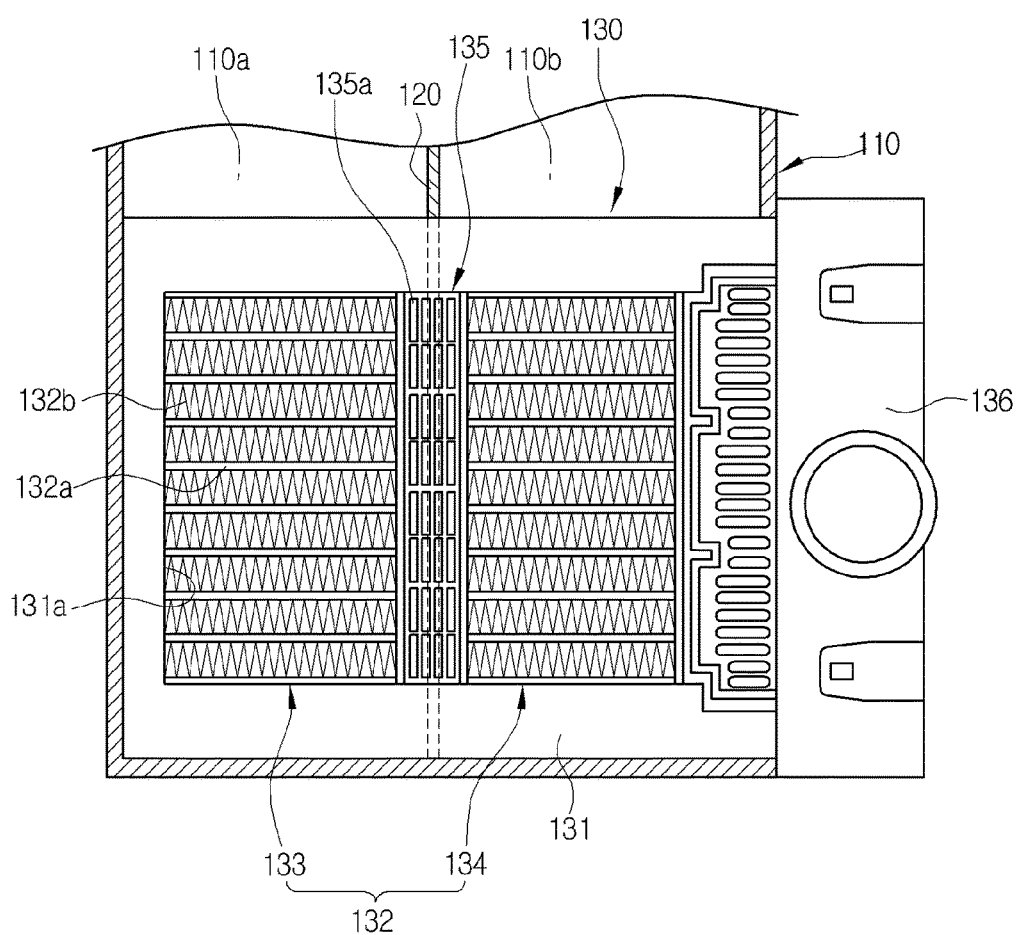
FIG. 7 is a view of a PTC heater for a vehicle according to another preferred embodiment of the present invention.

FIG. 7 illustrates a PTC heater according to another preferred embodiment of the present invention, and only parts, which are different from the PTC heater 130 according to the first preferred embodiment, will be described.

In the PTC heater 130 illustrated in FIG. 7, heating rods 132a of the first core 133 and heating rods 132a of the second core 134 are mounted in the same direction as the right-and-left direction inside the air-conditioning case 110.

In this instance, preferably, the heating rods 132a of the first core 133 and the heating rods 132a of the second core 134 are mounted on the same line.

Furthermore, a heat protection member 135 mounted between the first core 133 and the second core 134 is mounted at right angles to the heating rods 132a.

Figure 5:
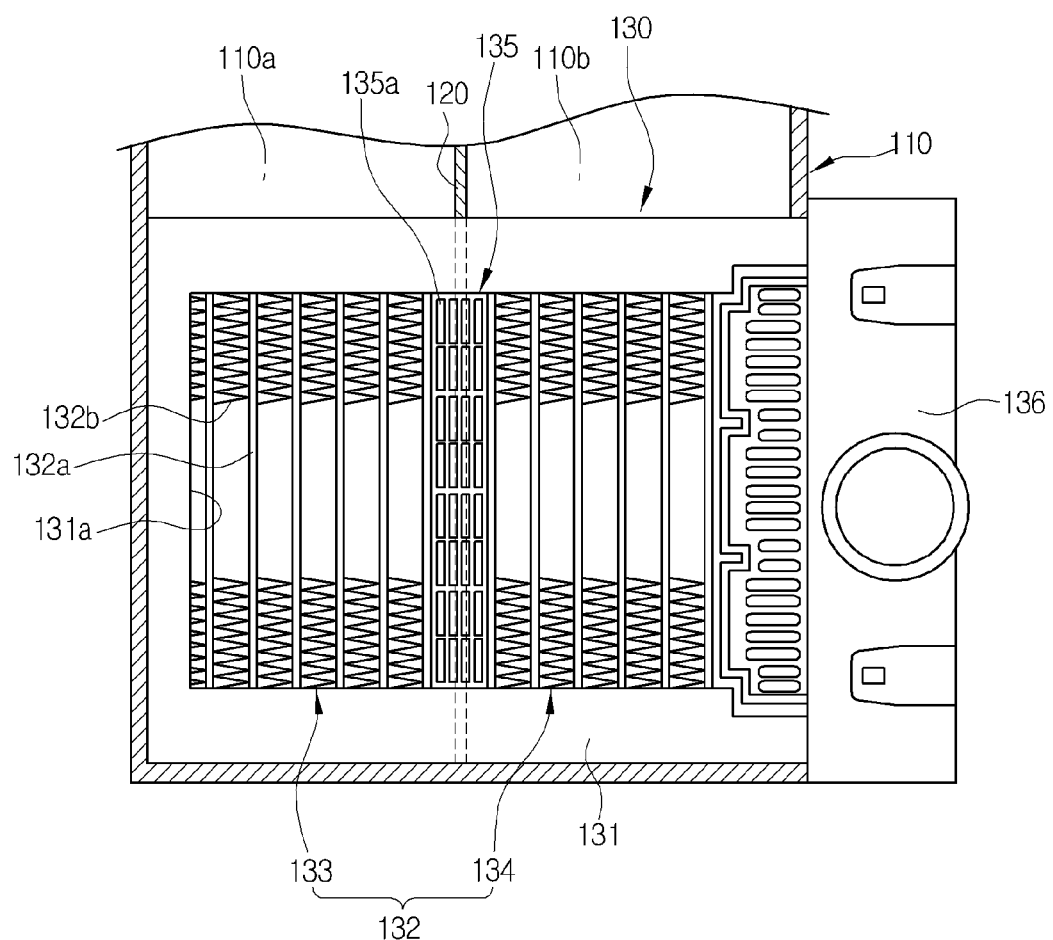
FIG. 5 is a view of the PTC heater of FIG. 4 is seen in the direction A.
Figure 6:
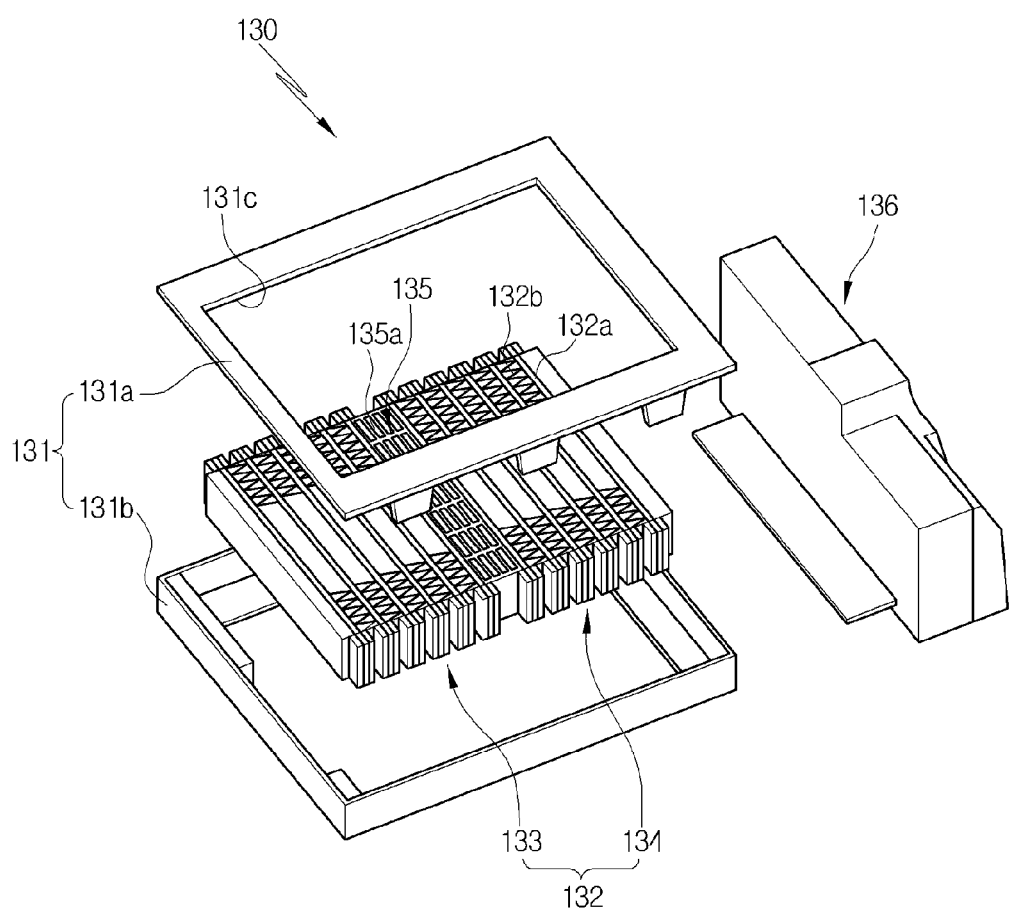
FIG. 6 is an exploded perspective view of the PTC heater according to the preferred embodiment of the present invention.

Meanwhile, the PTC heater 130 of FIG. 7 is different from the PTC heater 130 of FIG. 5 in that the mounting direction of the heating rods 132a of FIG. 7 is different from that of the heating rods 132a of FIG. 5, but the PTC heater 130 of FIG. 7 is equal to the PTC heater 130 of FIG. 5 in the structure.

As described above, in order to independently control temperature of the air passing through the first passageway 110a and the air passing through the second passageway 110b of the air-conditioning case 110, because the single PTC heater 130 which can independently control the first core 133 and the second core 134 is mounted in an air conditioner for a vehicle, the air conditioner can reduce manufacturing costs and weight and enhance vehicle fuel efficiency and productivity.

Additionally, the PTC heater 130 for the vehicle according to the present invention can provide an effective heating performance even in a small space and is easily applicable to other vehicles using PTC heaters manufactured by the same manufacturing company.

Herein after, an air flow process in the air-conditioning case 110 in which the PTC heater 130 for a vehicle according to the present invention is mounted will be described.

First, when the blower unit is operated, air is blown to the air inflow port 111 of the air-conditioning case 110, and then, passes through the evaporator 101. In this instance, the air exchanges heat with cold refrigerant flowing in the evaporator 101 to be cooled.

The air cooled while passing through the evaporator 101 passes through the first core 133 and the second core 134 of the PTC heater 130 while passing through the first passageway 110a and the second passageway 110b of the air-conditioning case 110.

In this instance, when the heat values are controlled differently through the independent control of the first core 133 and the second core 134 of the PTC heater 130, temperature of the air passing through the first core 133 is different from temperature of the air passing through the second core 134.

Continuously, the airs respectively passing through the first core 133 and the second core 134 of the PTC heater 130 are discharged to the air outflow port opened according to air outflow modes, such as a face mode, a bi-level mode, a floor mode, a mixing mode and a defrost mode, and then, are supplied to various parts of the interior of the vehicle.

The invention claimed is:

1. A positive temperature coefficient (PTC) heater for a vehicle, which is inserted and mounted in a plurality of passageways formed inside an air-conditioning case to heat air flowing in the passageways, the PTC heater comprising:
   a housing inserted and mounted across the passageways of the air-conditioning case; and
   a core part formed by a plurality of cores respectively arranged on the passageways inside the housing,
   wherein the PTC heater independently controls the cores arranged on the passageways to independently heat airs respectively flowing in the passageways,
   wherein the passageways are formed with a first passageway and a second passageway which are formed inside the air-conditioning case, and wherein the cores are formed with a firs core arranged on the first passageway and a second core arranged on the second passageway,
   wherein a heat protection member for preventing heat transfer between the first core and the second core is mounted between the first core and the second core,
   wherein the heat protection member includes at least one bypass hole to make some of the air passing through the PTC heater bypass the first core and the second core.

2. The PTC heater according to claim 1, wherein each of the first core and the second core includes a plurality of heating rods and radiation fins mounted between the heating rods, and
   wherein the heating rods of the first core and the heating rods of the second core are mounted in parallel with each other.

3. The PTC heater according to claim 1, wherein the heating rods of the first core and the heating rods of the second core are mounted at right angles to the right-and-left direction inside the air-conditioning case.

4. The PTC heater according to claim 1, wherein the heat protection member is formed in a lattice type such that the bypass hole is also formed in a lattice type.

5. The PTC heater according to claim 1, wherein a separator for partitioning the first passageway and the second passageway from each other is mounted inside the air-conditioning case, and
   wherein the heat protection member is mounted at a position corresponding to the separator.

6. The PTC heater according to claim 2, wherein a control unit for controlling voltage supplied to the first core and the second core is disposed at one side of the housing, which is parallel with the heating rods of the first core and the second core.

7. The PTC heater according to claim 1, wherein each of the first core and the second core includes a plurality of heating rods and radiation fins mounted between the heating rods, and
   wherein the heating rods of the first core and the heating rods of the second core are mounted in the same direction as the right-and-left direction inside the air-conditioning case.

8. The PTC heater according to claim 7, wherein the heating rods of the first core and the heating rods of the second core are mounted on the same line.

* * * * *